3,313,755
AQUEOUS POLYMER LATICES CONTAINING AN EMULSIFIER OF A PARTIAL ESTER OF A STYRENE-MALEIC ACID ANHYDRIDE COPOLYMER
William P. O'Rourke, Babylon, N.Y., assignor to Knomark, Inc., Brooklyn, N.Y., a corporation of New York
No Drawing. Filed Mar. 9, 1962, Ser. No. 178,584
8 Claims. (Cl. 260—28.5)

This invention relates to resinous materials useful as emulsifiers and protective colloids, to the use of these materials as emulsifiers and protective colloids in aqueous polymerization systems, to aqueous latices obtained by polymerizations carried out in the presence of the novel resins, and to compositions containing these latices.

The resins of the present invention are water-resistant, alkali-resistant, acid-soluble substances useful as cationic emulsifiers. These resins are film-forming, and are useful components of film-forming compositions, for example floor polishes, in which alkali-resistance and water-resistance are highly desirable. Films produced with the resins herein described show no significant swelling in contact with water, i.e. they are water-resistant, and are not affected by cold alkali at a pH up to about 11, i.e. they are resistant to common alkaline materials such as household detergents, soaps, and ammonia. Thus, floor polishes and other film-forming compositions prepared with the resins of the invention as hereinafter described form particularly useful coatings resistant to the rigors of ordinary cleaning, but which, because of their acid solubility, can be removed by mild treatment with weak acids.

The resins of the invention are partial esters formed between monohydric alcohols and monohydric amino alcohols and a polymeric styrene-maleic anhydride acidic component. The styrene-maleic anhydride copolymers forming the acid component of the resinous materials of the invention contain styrene copolymerized with maleic anhydride in a molar ratio between about 1:1 and about 3:1. The materials are commercially available from Texas Butadiene and Chemical Corporation under the tradenames "SMA 1000A," "2000A," and "3000A." The materials, which contain acid anhydride groups, have a molecular weight between about 1400 and about 2500, usually between about 1600 and about 2200, and contain on the average about 8 repeating units each comprising a maleic anhydride group and one, two, or three styrene molecules in conjunction therewith.

These polymeric acid anhydride materials are solids whose melting points vary from about 140° C. to about 180° C., and are water-insoluble materials. For the purposes of the present invention, those acid materials containing styrene and maleic anhydride copolymerized in about a 1:1 ratio are preferred. These materials are physically the hardest, and have the highest melting point. Since esterification of these acid polymers to form the partial esters of the invention tends to reduce hardness and melting point in the product, it is preferred to esterify those acid polymers having the highest initial melting point and hardness. Also, the 1:1 copolymer has the highest carboxyl functionality per unit of molecular weight.

In forming the partial esters of the invention, about 20 to 35%, preferably about 25%, of the number of potential carboxyl groups present as acid anhydride groups in the styrene-maleic anhydride copolymer are reacted with a monohydric alcohol, and the remaining carboxyl groups or potential carboxyl groups are reacted with a monohydric amino alcohol in a number sufficient to impart acid solubility to the resulting ester. For acid solubility, at least about 25% of the total number of potential carboxyl groups present in the unesterified acid copolymer should be reacted. Although the total number of these carboxyl groups reacted with the amino alcohol may be as high as 50%, the formation of additional ester groups has a tendency to soften the resinous product and lower its melting point, so that the optimum number of carboxyl groups reacted with amino alcohols is substantially the minimum number necessary to give acid solubility, or about 25%.

Thus, between 15–55% of the total number of carboxyl groups present or potentially present as anhydride groups in the partially esterified resin product may be present in an unesterified state. Nevertheless, the ester resin has the alkali resistant properties earlier described.

As the monohydric alcohol reacted to esterify the acid copolymer, monohydric primary alcohols of aliphatic and cycloaliphatic hydrocarbons having from 18 to 22 carbon atoms are preferred. Alcohols such as oleyl, stearyl, eicosyl, docosyl, and abietyl alcohols are exemplary materials and are representative of both aliphatic and cycloaliphatic alcohols, including unsaturated materials. Abietyl alcohol is preferred as the monohydric alcohol component of the esters in view of its high molecular weight, which lessens any tendency of the esterified product to become soft or tacky. Also, abietyl alcohol has good hydrophobic character, and, further, imparts a light color to the product.

Monohydric primary β,β-dimethyl substituted aliphatic alcohols having eight or more carbon atoms can also be employed in preparing the new resins of the invention.

The amino alcohol component of the partial esters is suitably a monohydric monoamine. Although secondary and tertiary alcohol materials can be employed, substances having primary hydroxy groups are preferred because of the ease with which the latter enter into esterification reactions.

The amino group of the amino alcohol is, suitably, one free of active (amide forming) hydrogen atoms, e.g. a tertiary amino group or a sterically hindered secondary amino group. The use of amino alcohols of this type assures that, on reaction with the acid copolymer earlier mentioned, esterification will occur, rather than amidification.

Particularly useful amino alcohols of this type are produced when secondary amines are condensed with from 1 to 5 moles of ethylene oxide according to the following reaction:

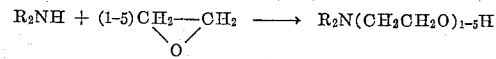

In the formula each R is the same or a different alkyl group having 1 to 18 carbon atoms, preferably 1 to 6 carbon atoms, or phenyl, so that the resulting products may be characterized as aliphatic or aromatic amino alcohols or polyalkoxy alcohols. Typically R may be methyl, ethyl, propyl, butyl, amyl, hexyl, octyl, dodecyl, stearyl, etc.

Useful secondary amino alcohols are produced according to the reaction

In the latter product, to discourage amide-forming reactions, R is preferably a bulky alkyl or aryl group inactivating the available hydrogen on the nitrogen atom by steric hindrance. Thus, R is preferably a tertiary alkyl group having 1 to 22 carbon atoms (e.g. t-butyl), preferably 1 to 6 carbon atoms, or phenyl.

Exemplary amino alcohols of this type include N,N-dimethyl amino ethanol, N,N-diethyl amino ethanol, t-butyl amino ethanol, phenyl ethanolamine, phenylethyl ethanolamine, and the "Priminox R" and "Priminox T" materials described in the booklet "Priminox Polyethoxy Amines" published by Rohm and Haas, Philadelphia.

The "Priminox" materials are polyethoxy addition products produced by reacting RNH amines with e.g. 1–5 moles of ethylene oxide, R being a tertiary radical having 12–14 carbon atoms or 18–22 carbon atoms, e.g. t-stearyl-, and t-lauryl-amino alcohols, and the like.

Although the acid copolymer, the monohydric alcohol, and the amino alcohol can be simultaneously reacted to effect the esterifications forming the resin products of the invention, differences in the volatilities of the components, particularly the high volatility of the amino alcohol, make it convenient first to react the monohydric alcohol and acid component, than further to react this reaction product with the amino alcohol. None of the esterification reactions need be catalyzed, but suitable catalysts can be employed if desired.

For reacting the acid copolymer and the monohydric alcohol, the solid acid copolymer is conveniently dispersed in finely divided form as a slurry in the alcohol, then heated with refluxing until a uniform fluid product is formed. Reaction temperature (reflux temperatures) and reaction time will, of course, vary with the nature of the specific reactants employed. When reacting the acid copolymer with abietyl alcohol, for example, the reflux temperature is gradually raised to about 230° C. and complete reaction occurs in 3 hours or less.

After a uniform product has been obtained in this reaction, the reaction mixture is cooled to below the boiling point of the amino alcohol next to be reacted, and the amino alcohol is then added. The reaction mixture is again suitably refluxed for a period from about ½ hour to about 3 hours, after which water formed in the esterification is removed from the system, for example by attaching a trap and withdrawing water from the apparatus. A final short heating is convenient to promote complete esterification. For most of the amino alcohols herein earlier described, esterification takes place in about one hour of heating at a temperature between about 150–160° C., although, again, the reflux temperature and reaction times will vary with the specific reagents reacted, as will be appreciated by those skilled in the art.

After completion of the esterification with the amino alcohol, the reaction product is discharged from the reaction vessel while still hot and fluid. On cooling, the reaction product is a brittle resinous solid, soluble in acid, but insoluble in water or alkali other than hot, highly caustic solutions.

When neutralized, i.e. treated with sufficient acid to render it soluble, the resinous ester product just described is a cationic film-forming emulsifier and/or protective colloid. For neutralization, that is, solubilization, any water-soluble mineral or organic acid can be employed, including acids such as hydrochloric, sulfuric, nitric, nitrous, phosphoric, phosphorous and the like, and acetic, formic, propionic, butyric, tartaric, citric, and other organic acids. For solubilizing the resin, the acid employed is not critical. However, since there is a tendency for the resin to form gels (perhaps due to cross-linking) when neutralized with a polybasic acid, it is preferred to use a monobasic acid for the neutralization, or a polybasic acid in which the ionization constant of the second or further hydrogen ions is so low as not to form salts with the amino groups of the resin ester.

The neutralized materials can be used as cationic emulsifiers or surface action agents. The new materials are particularly useful as emulsifiers in the aqueous emulsion polymerization of ethylenically unsaturated monomers, preferably vinylidene-type ($CH_2=C<$) monomers (including vinyl and methacryl monomers), such as ethylene, acrylates and methacrylates, vinyl esters, vinyl chloride, vinylidene chloride, styrene, α-methyl styrene, acrylonitrile, and the like, including materials such as butadiene, isoprene, and chloroprene, for example.

Surprisingly, latices prepared with the resinous emulsifier/protective colloid of the invention are extraordinarily freeze-thaw stable, as compared with similar latices containing conventional anionic, non-ionic, or other cationic emulsifying materials.

When the resinous materials of the invention are used in easily emulsified systems in which a protective colloid is not necessary, for example in the polymerization of acrylate monomers, they are used in amounts conventional for emulsifying agents, in these systems, usually about 0.5–10% by weight of the monomer polymerized.

When used in aqueous polymerization systems in which a protective colloid is preferably employed, for example the polymerization of styrene, the resins of the invention are used in amounts of from about 10–30% by weight of the monomer, and function both as an emulsifier and as a protective colloid. Alternatively, the resinous esters of the invention can be employed in these systems in smaller amounts conventional for emulsifying agents if they are combined with conventional protective colloids, for example hydroxyethyl cellulose.

The use of the new materials as emulsifiers and/or protective colloids requires no changes in the polymerization techniques conventionally used in these systems with other emulsifiers. For example, the temperature and pressure conditions for polymerization in the presence of the new materials are the same as those usual in the art for such polymerizations. Similarly, conventional initiator systems well known to those skilled in the prior art, such as free-radical forming inorganic and organic per compounds (e.g. persulfates and organic peroxides) or azo compounds, and redox systems, can be employed. Surprisingly, the use of the cationic materials of the invention in emulsion polymerizations increases the rate of polymerization over that shown when anionic emulsifiers are used, other conditions being equal.

It has been discovered that the use of the resinous partial esters earlier described as emulsifiers and protective colloids in certain polymerization systems gives latex products with unusual properties of special utility for use in coating applications, e.g. textile finishing, paint formulation, and, above all, the formulation of aqueous polishes such as floor polishes.

Thus, when the new resin esters are employed as emulsifying agents and protective colloids in the polymerization of styrene, or of acrylate and methacrylate esters of alkanols having 1–8 carbon atoms, or in the copolymerization of any of these materials in all proportions, latices containing polymer particles of small particle size particularly desirable for the production of glossy coatings are produced. These latices can be readily combined with other cationic and/or non-ionic materials to produce acid-removable, alkali- and water-resistant film-forming compositions.

In the production of these particularly useful latices, the ester resins are suitably used as emulsifiers and protective colloids in amounts of from 15–30%, preferably 20%, by weight of the monomer polymerized, and can be used with other optional non-ionic or cationic emulsifying agents. These percentages refer to the weight of the unneutralized resins based on the monomer weight, although the resins are used in neutralized form, as earlier disclosed.

In these systems, the monomers are dispersed in the aqueous phase—with the aid of the emulsifiers and protective colloids—in amounts such that the latex produced on polymerization will contain 25–50% by weight of polymer solids, taking into account the fact that the conversion of polymer is substantially complete (substantially 100 percent conversion). The catalysts or initiators employed are those conventional in styrene, acrylate, or methacrylate polymerizations, namely free radical forming materials such as the per compounds earlier mentioned or azo compounds such as azo-diisobutyronitrile. With these initiators, temperatures above about 60° C. are employed, generally about 60–80° C., as is usual, although higher temperatures can be employed if pressure systems are used for the polymerization.

Also, redox systems comprising an oxidizing component, such as an organic peroxide, and a reducing component can be employed, as known in the art. Polymerization in this case can be effected at temperatures as low as 25° C., preferably in a range from 25°–75° C., although higher temperatures may again be employed if pressure equipment is used.

These initiators are used in amounts known to those in the art as suitable for such polymerizations, generally less than about 0.1% by weight of the monomer. Since the materials are present in trace quantities, the specific choice of free radical initiator or of the redox system has no substantial effect on the properties of the latex produced. Particle size in the resulting latices varies from less than about 0.01 micron up to about 1 micron. In the polymers and copolymers, the degree of polymerization is from about 100 to about 150.

In the formulation of aqueous floor polishes from the resulting latex, the solids content of the latex is conveniently reduced to a value of about 10 to about 20% by weight, preferably 14–18%, by dilution with water. This polymer emulsion is then mixed with waxes and leveling or coalescing agents to form the final polish product.

The waxes, which may be synthetic or natural waxes, e.g. polyethylene, Fischer-Tropsch, oxidized microcrystalline, carnauba, and the like, are conveniently employed in the form of aqueous non-ionic or cationic emulsions having a solids content of from about 10 to about 20% by weight, and are simply mixed in with the latex containing the polymer component. Numerous emulsifiable waxes suitable for floor polish use are well known in the art and their choice is not a part of the present invention.

Leveling or coalescing agents, such as "Carbitol" (diethylene glycol monomethyl ether), tributoxy ethyl phosphate, tributyl phosphate, triethyl phosphate, etc., and other non-ionic and cationic surface active agents are added to give a final polish product containing from 0.5 to about 1% of these materials. Again, numerous leveling agents are known in the polish formulation art and do not form a part of the present invention.

The final polish product contains from 10 to 20% by weight of total solids, with the waxy component varying between 10–30% of the total solids, depending on the physical properties desired in the final product, and leveling agents in the amounts just described. When preparing polymers for use in compositions such as floor waxes, the neutralized resin emulsifying agent is usually prepared with a volatile acid, e.g. formic and/or acetic acids. These acids readily evaporate from floor polish films to give a highly water-resistant, acid-removable coating.

A better understanding of the invention and of its many advantages will be had by referring to the following specific examples given by way of illustration.

Example 1

A mixed ester of hydroabietyl alcohol and dimethyl amino ethanol with a styrene-maleic anhydride copolymer (1:1) having an average of two anhydride groups per molecule was formed by heating 350 g. (1 equivalent) of hydroabietyl alcohol, 134 g. (2 equivalents) of dimethyl amino ethanol, and 444 g. (about 4 equivalents) of the acid copolymer at reflux for about 2 hours until a fluid mass was obtained. A water trap was inserted into the system and the water of esterification was removed while maintaining a temperature of about 150–160° C. When the water level in the trap appeared constant, the temperature of the reaction mixture was gradually raised to about 200° C. to promote complete esterification.

The mixed ester product was a light amber resinous material insoluble in water and dilute alkali but soluble in dilute acid. A similar product is produced by using equivalent quantities (e.g. 1.5–2.0 mols) of diethyl amino ethanol or t-butyl amino ethanol, for example, or by using equivalent quantities of other styrene-maleic anhydride copolymers such as the commercially available 1:2 or 1:3 materials.

Example 2

A mixed ester of docosyl alcohol and dimethyl amino ethanol was prepared by heating 308 g. of commercial behenyl (docosyl) alcohol, 134 g. of dimethyl amino ethanol, and 444 g. of a 1:1 styrene-maleic anhydride copolymer at reflux for about 1½ hours until a fluid mass was obtained. The water of esterification was removed from the system with the aid of a trap, and when the removal appeared complete the temperature was gradually raised to about 310° C. to complete the esterification.

The product was a soft amber resin, waxy in texture, having the same solubility characteristics as the product of Example 1.

Example 3

120 g. of methylmethacrylate, 108 g. of methylacrylate, and 12 g. of 2-ethylhexyl acrylate were emulsified in 512 g. of water with the aid of 36 g. of the mixed ester of Example 1 neutralized with 10 ml. of glacial acetic acid.

The emulsified monomer mixture was copolymerized in the presence of about 0.5–1 g. of t-butyl hydroperoxide and trace quantities (less than 0.5 g.) of sodium formaldehyde sulfoxalate as the redox system initiating polymerization.

The resulting latex product contained extremely fine particles (between about 0.1 and 1 micron) of a polymer having an average molecular weight between about 100,000–150,000 and was particularly adaptable to the formulation of alkali resistant floor polish materials.

Example 4

50 parts by weight of the latex of Example 3 were diluted with 50 parts of water to give a solids content of about 18%. This was combined with 2 parts of "Carbitol" and 1 part of tributoxy ethyl phosphate as leveling agents. 10 parts of a cationic emulsion of oxidized polyethene wax (e.g. "AC–629" or "Epolene E–10") (18% solids) were blended to give a liquid polish product.

A semi-buffable polish containing more wax is made by adding 30 parts of the wax emulsion.

Example 5

A styrene homopolymer latex was prepared by emulsifying 240 g. of styrene in 512 g. water with the aid of 80 g. of the mixed ester of Example 1 (prepared with 176 g. of diethylamino ethanol, rather than the dimethyl material of that example), neutralized with 15 ml. of glacial acetic acid. Optional auxiliary emulsifiers were present, namely 6.0 g. of the sulfate of "Amine C" (an imidazoline having a $C_{12}$ substituent) and 2.5 g. of a 6 mol adduct of ethylene oxide and a tallow alcohol.

The monomer was polymerized at 30° C. with 1 g. t-butyl hydroperoxide and 0.5 g. sodium formaldehyde sulfoxalate.

Example 6

50 g. of the latex of Example 5 were diluted with 50 g. water to give a latex containing about 18% solids. About 3 parts of leveling agents and 20–30 parts of a 18% cationic polyethylene latex were combined with the styrene homopolymer latex to give a floor polish having high surface gloss.

Although specific embodiments have been herein shown and described, it is to be understood that they are illustrative, and are not to be construed as limiting on the scope and spirit of the invention.

What is claimed is:

1. A polish composition consisting essentially of a fluid aqueous suspension of a polyvinylidene polymer and an emulsifiable wax, together with leveling agents, said polymer being suspended in said aqueous fluid with an emulsifier consisting essentially of a partial ester of a styrene-maleic acid anhydride copolymer, said copolymer having a molecular weight between about 1400 and about 2500 and having a molar ratio of styrene to maleic acid anhydride therein between about 1:1 and 3:1, from about 20 percent to about 35 percent of the carboxyl groups of said copolymer being esterified with a monohydric primary aliphatic or cycloaliphatic alcohol having from 18 to 22 carbon atoms, and from about 25 percent to about 50 percent of the carboxyl groups of said copolymer being esterified with a monohydric monoamine free of amide-forming hydrogen atoms and selected from the group consisting of monohydric tertiary monoamines and monohydric secondary monoamines having a sterically hindered amino group.

2. A polish composition as in claim 1 wherein said polyvinylidene polymer is a member selected from the group consisting of (1) homopolymers of styrene, acrylate monomers, and methacrylate monomers, and (2) copolymers formed between styrene, acrylate monomers, and methacrylate monomers.

3. A polish composition as in claim 1 wherein said monohydric monoamine is a monohydric tertiary amine.

4. A polish composition as in claim 1 wherein said monohydric primary alcohol is hydroabietyl alcohol.

5. A latex consisting essentially of finely divided particles of a polyvinylidene polymer suspended in an aqueous fluid with an emulsifier consisting essentially of a partial ester of a styrene-maleic acid anhydride copolymer, said copolymer having a molecular weight between about 1400 and about 2500 and having a molar ratio of styrene to maleic acid anhydride therein between about 1:1 and 3:1, from about 20 percent to about 35 percent of the carboxyl groups of said copolymer being esterified with a monohydric primary aliphatic or cycloaliphatic alcohol having from 18 to 22 carbon atoms, and from about 25 percent to about 50 percent of the carboxyl groups of said copolymer being esterified with a monohydric monoamine free of amide-forming hydrogen atoms and selected from the group consisting of monohydric tertiary monoamines and monohydric secondary monoamines having a sterically hindered amino group.

6. A latex as in claim 5 wherein said polyvinylidene polymer is a member selected from the group consisting of (1) homopolymers of styrene, acrylate monomers, and methacrylate monomers, and (2) copolymers formed between styrene, acrylate monomers, and methacrylate monomers.

7. A latex as in claim 5 wherein said monohydric monoamine is a monohydric tertiary amine.

8. A latex as in claim 5 wherein said monohydric primary alcohol is hydroabietyl alcohol.

References Cited by the Examiner

UNITED STATES PATENTS

| | | | |
|---|---|---|---|
| 2,169,366 | 8/1939 | Meigs | 260—28.5 |
| 2,239,718 | 4/1941 | Izard | 260—28.5 |
| 2,606,165 | 8/1952 | Chapin et al. | 260—28.5 |
| 2,607,762 | 8/1952 | Bowen | 260—78.5 |
| 2,676,934 | 4/1954 | Butler | 260—28.5 |
| 2,723,195 | 11/1955 | Blake | 260—78.5 |
| 2,845,398 | 7/1958 | Brown et al. | 260—28.5 |
| 2,870,128 | 1/1959 | Sellers | 260—78.5 |
| 2,971,934 | 2/1961 | Brown et al. | 260—28.5 |
| 2,977,334 | 3/1961 | Zopf et al. | 260—78.5 |

MORRIS LIEBMAN, *Primary Examiner.*

J. W. BEHRINGER, B. A. AMERNICK,
*Assistant Examiners.*